Jan. 30, 1962 W. M. GRUBER 3,018,658
APPARATUS FOR CONTROLLING RATE OF CHANGE OF CONDITION
Filed Nov. 5, 1954 6 Sheets-Sheet 1

Inventor
Warren M. Gruber
Synnestvedt + Lechner
Attorneys

Jan. 30, 1962 W. M. GRUBER 3,018,658
APPARATUS FOR CONTROLLING RATE OF CHANGE OF CONDITION
Filed Nov. 5, 1954 6 Sheets-Sheet 2

Inventor
Warren M. Gruber
By
Synnestvedt + Lechner
Attorneys

Jan. 30, 1962   W. M. GRUBER   3,018,658
APPARATUS FOR CONTROLLING RATE OF CHANGE OF CONDITION
Filed Nov. 5, 1954   6 Sheets-Sheet 3

Fig. 3.

Inventor
Warren M. Gruber
By
Synnestvedt + Lechner
Attorneys

Jan. 30, 1962 W. M. GRUBER 3,018,658
APPARATUS FOR CONTROLLING RATE OF CHANGE OF CONDITION
Filed Nov. 5, 1954 6 Sheets-Sheet 6

Fig. 12.

INVENTOR
Warren M. Gruber
BY
Synnestvedt + Lechner
ATTORNEYS

United States Patent Office 3,018,658
Patented Jan. 30, 1962

3,018,658
APPARATUS FOR CONTROLLING RATE OF CHANGE OF CONDITION
Warren M. Gruber, Horsham, Pa., assignor to Tinius Olsen Testing Machine Company, Willow Grove, Pa., a corporation of Pennsylvania
Filed Nov. 5, 1954, Ser. No. 467,165
14 Claims. (Cl. 73—90)

This invention relates to apparatus such as a testing machine for automatically or manually controlling the rate of change of condition in a body, for example, the rate of strain of a body, or the rate of applying stress to a body to cause such strain.

Testing machines of the kind in question ordinarily have a fixed crosshead and a movable crosshead between which a specimen may be appropriately supported. In making tests in tension, compression or flexure, the specimen is loaded or stressed by displacing the movable crosshead with respect to the fixed crosshead.

When making such tests, the physical properties of certain metals or plastics may be altered or assume different characteristics, depending upon the rate at which load is applied or the rate at which deformation takes place. For example, with the metal titanium, the rate of load application is vital because strain hardening takes place where load is applied beyond a certain critical rate. In production work, where selected samples from a large run of parts are to be subjected, say, to a tension test up to a given number of pounds, it is important that the same rate of loading be applied to each sample in order to obtain true test information. So, too, where a part is to be supplied by several different manufacturers, tests of the parts as between manufacturers must be duplicates of one another.

Thus, in testing work it is important, in order to duplicate test conditions, to be able to stress or strain a specimen at a known rate. Preferably, the stressing or straining is done at some preselected constant rate.

The principal object of the invention is to provide a device to enable accurate reproduction of test conditions, either on a testing machine where the load-applying system is hydraulic or on a machine where the load-applying system is electro-mechanical.

In one embodiment, the invention is applied to either type of the above-mentioned machines and the operator manipulates the machine to perform the required test. In another embodiment, the invention is applied to either type of machine such that the machine automatically operates without intervention of the operator during the test.

There are certain devices available on the market for the purpose of enabling a testing machine operator to maintain constant straining rate during a testing operation. These devices are also applied for the purpose of maintaining constant crosshead motion, which sometimes is used as a measure of strain. In general, these devices include a monitor or meter which has a disk automatically rotated at a preselected constant speed, and a pointer is mounted coaxially with the disk, the pointer being actuated or rotated through the motion of the crosshead or through the deformation of the specimen. In order to maintain a constant straining rate, the testing machine operator must control the loading of the specimen such that the rotation of the pointer coincides with the rotation of the disk. These systems have an inherent disadvantage in that it is often difficult to maintain the rotating pointer in alignment with the rotating disk. This results in "hunting," the amount of which may vary over the test range, and consequently, the test specimen is not loaded or stressed at the desired uniform rate, which is not conducive to accurate test duplication.

The structure and mode of operation of my device is radically different from devices as mentioned above and permits true constant rate, hence, true duplication to be obtained throughout both the elastic and plastic stages of deformation. My devce includes a meter which has a fixed calibrated scale and a movable needle. The various scale calibrations correspond, for example, to different rates of straining. The desired straining rate is selected and the operator, in manual operation, merely has to manipulate the testing machine so that the meter needle moves up to and then remains in fixed position with respect to the selected calibration. The specimen is then strained at the desired rate. My device may also be used to maintain a constant stressing rate or to maintain constant crosshead motion. The idea of the needle being held fixed with respect to a scale calibration, is used in these applications.

In automatic operation, the testing machine operator merely has to move a knob until the meter needle coincides with a preselected calibration and the machine then automatically performs the required test.

Certain of the applications of the invention and the details of construction thereof will be described in connection with the drawings wherein.

Figure 1:
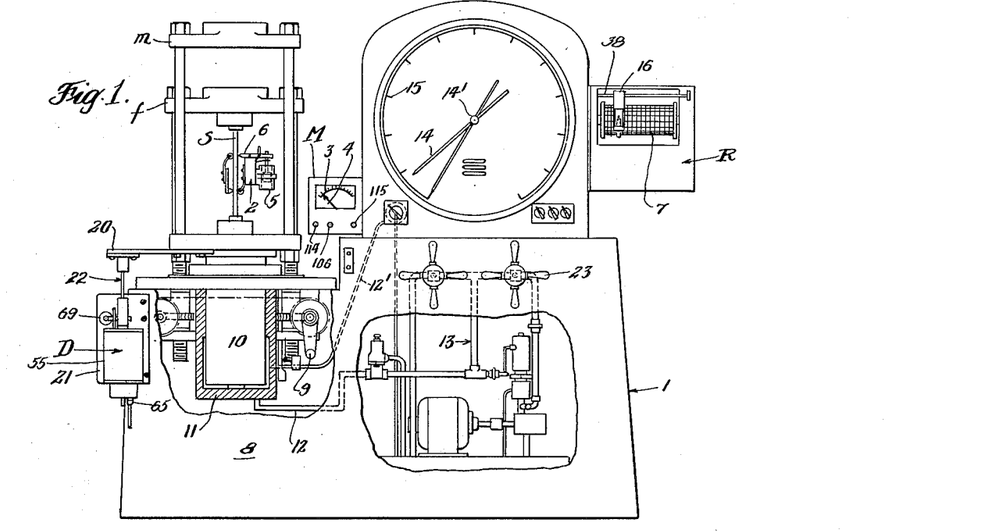
FIGURE 1 is a sectional elevational view illustrating one manner by which the invention is applied to a testing machine for controlling the rate of crosshead motion.

FIGURE 1 illustrates the manner in which the invention may be used with a hydraulic testing machine as a crosshead motion indicator or controller. An indicating meter M has a scale 3 calibrated, for example, in inches per minute. The operator knowing the desired rate of crosshead movement, manipulates the testing machine to bring the needle 4 into alignment with a preselected scale calibration and by maintaining the needle at the selected position, the crosshead will move at the desired constant rate. The needle is driven in accordance with a signal generated by the sensing device indicated by the letter D.

In the testing machine of FIGURE 1 a test specimen S is supported between a fixed crosshead $f$ and a movable crosshead $m$. In the arrangement shown, upward movement of the movable crosshead causes the specimen to be stressed or loaded in compression. The specimen has an extensometer device generally indicated by the numeral 2 and carries a transducer or differential transformer 5, the core of which is adapted to be moved in accordance with the strain of the specimen by means of the arm 6. The transducer develops a signal proportional to the amount of strain. The transducer is connected with a recorder R and is used to drive the drum 7 thereof. The mechanism for accomplishing this is shown in copending application of Robert S. Strimel, Serial No. 261,239, filed December 12, 1951, and entitled "Recording Device for Use in Conjunction With Testing Machine," and assigned to the same assignee as this invention, now Patent No. 2,812,229.

The fixed crosshead $f$ is mounted on the frame 8 and can be adjusted in a vertical direction by manipulation of the hand crank 9. The movable crosshead $m$ is secured to a vertically movable piston 10 mounted in the cylinder 11 which is supplied with fluid under pressure from line 12 connected with the hydraulic system generally indicated by the numeral 13.

The line 12' connects the pressure in the cylinder with an indicating system (see FIGURE 3), which drives a pointer 14 over a scale 15 such that the amount of load or stress is indicated. The same system drives a pen 16 of the recorder R. The manner in which the foregoing is accomplished is disclosed in copending application of Robert S. Strimel, Serial No. 230,877, filed June 11, 1951, and entitled "A Registering System for Use in Conjunction With Testing Machine," and assigned to the same assignee as this invention, now Patent No. 2,808,721. The movable crosshead $m$ has a bracket 20 fixed thereto and the sensing device D is mounted on the base 8 by the bracket 21. A rod 22 interconnects the sensing device with the movable bracket or control member 20. When the crosshead $m$ is actuated, the device D generates a signal in accordance with the rate of movement and this signal drives the needle 3 of the meter M in a manner explained hereinafter.

In running a test (assuming the components mentioned above are energized), the operator manipulates the handwheel 23, which effects a transfer of fluid under pressure to the cylinder 11 and starts the crosshead $m$ to move upwardly. The signal from the device D moves the needle 3 and by adjustment of the handwheel 23, the needle is brought into alignment with the preselected scale calibration. By holding the needle at the fixed position, the crosshead will be moved at a constant rate, the particular rate being determined by the selected position of the needle.

In some instances the rate of crosshead movement may be used as an indication of the rate of straining. However, where precise strain information is required, the foregoing is not recommended because inaccuracies may occur due to deformation in the free length of the test specimen or elastic deformation in the testing machine or in the specimen grips. The invention, however, is readily adaptable to the highly accurate control of straining rate, as will be generally explained following.

Figure 2:
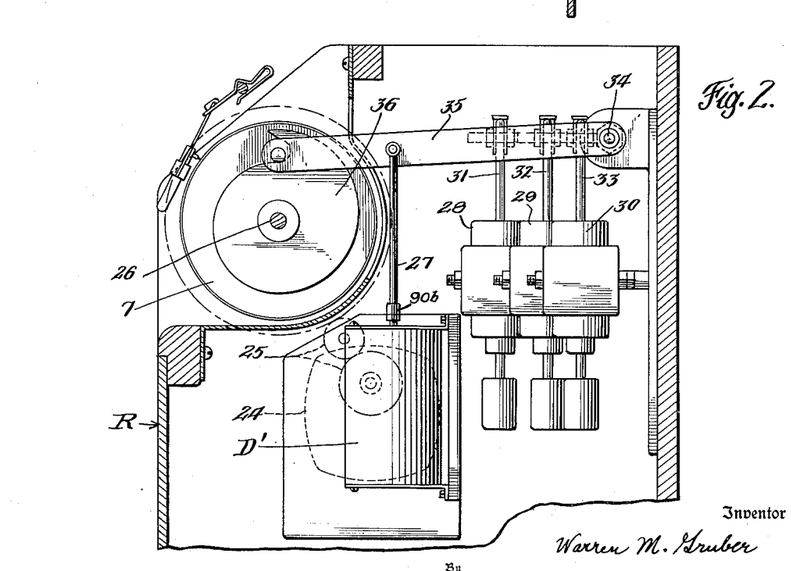
FIGURE 2 is a sectional elevational view showing one manner by which the invention is used with a recorder of a testing machine for controlling the rate of straining.

In FIGURE 2 I have shown a side elevation view of certain components of the recorder R mentioned in connection with FIGURE 1. As pointed out, the details of construction and operation of such a recorder are set out in Patent No. 2,812,229. For present purposes, the following description will suffice.

A servo motor 24 is adapted to rotate, through a gear train 25, a shaft 26 on which is secured a drum 7. The circuit for driving the motor includes the differential transformer 5 (see FIGURE 1), which develops a signal proportional to the amount of unit strain, this signal being adapted to be balanced against a signal from any one of the differential transformers 28, 29 and 30. (These latter transformers are selectively electrically connectible with the transformer 5, depending upon the range of strain.) The core stems 31, 32 and 33 are respectively connected to a shaft 34, on which is fixed a cam follower 35 riding on the cam 36, fixed to the shaft 26.

The signal resulting from the balancing of the signal from transformer 5 and one of the transformers 28, 29 and 30 is fed to an amplifier and thence to one coil of the servo motor 24. Rotation of the shaft 26 by the motor 24 causes rotation of the cam 36, which moves the cam follower 35, which rotates the shaft 34 and causes vertical displacement of the core stems and the transducer selected for operation tends to develop a signal the same magnitude and opposite phase as the signal of the transformer 5. The amount of displacement of the core stem of the transducer selected for operation is proportional to unit strain. Thus, the movement of the follower 35 is proportional to unit strain. If the load is applied rapidly, the specimen deforms rapidly; hence, the follower will move rapidly. Slower deformation of the specimen results in slower movement of the follower. So, too, if the specimen is strained at a constant rate, the follower will move at a constant rate.

My sensing device D' is connected to the follower or control member 35 by the rod 27 and when the follower moves at a constant rate, the device develops a constant D.C. voltage which is utilized to drive an indicating meter in a manner explained hereinafter. In this instance the scale of the meter is calibrated in inches per inch per minute. The difference in structure between the sensing devices D and D' will be explained hereinafter.

In running a test for constant straining, the operator manipulates the handwheel 23 (FIGURE 1) until the needle of the meter is brought into alignment with the scale calibration corresponding to the desired straining rate. By maintaining the needle in the fixed position, the constant straining rate is obtained throughout the length of the test.

While I have described the application of the invention to the control of crosshead motion and to straining, the invention is readily adaptable to control the rate at which a test specimen is stressed. This is briefly described following.

As mentioned above, Patent No. 2,808,721 describes a system for moving an indicating pointer of a recording head in accordance with the amount of stress being applied to a test specimen. This system is shown in part in FIGURE 3.

Figure 3:
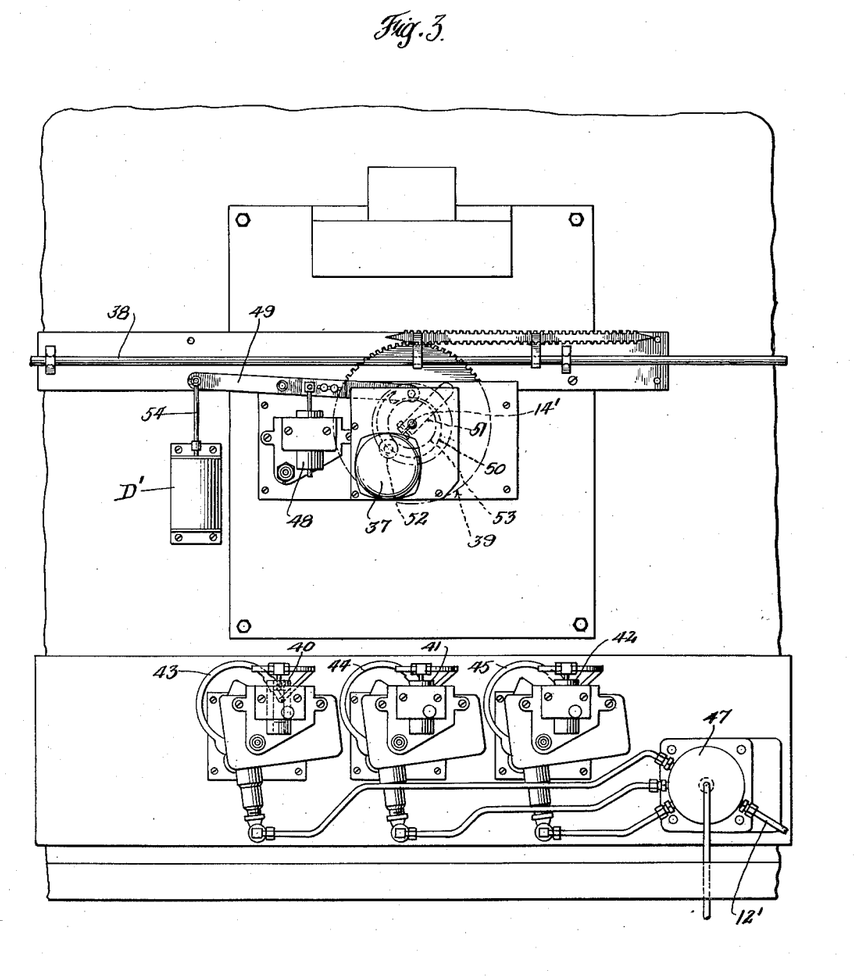
FIGURE 3 is an elevational view showing one manner by which the invention is used with an indicating system of a testing machine for controlling the rate of stressing.

The servo motor 37 is adapted to rotate the shaft 14', which carries pointer 14 (FIGURE 1), and to displace the rod 38 by means of a gear and rack arrangement generally indicated by 39. The rod carries the recording pen 16. The circuit for controlling the motor includes the differential transformers 40, 41 and 42, the cores of which are respectively adapted to be displaced by the Bourdon tubes 43, 44 and 45. Depending upon the range of stress desired, the Bourdon tubes may be selectively interconnected to the line 12' by the valve 47, the valve also selecting the corresponding differential transformer for operation. The differential transformer selected develops a signal in accordance with the magnitude of stress and this signal is adapted to be balanced with a signal from the differential transformer 48, the resulting signal being fed through an amplifier to one coil of the motor 37. The core of transformer 48 is displaced by the motor rotation, being interconnected thereto by the cam follower 49, cam 50, which is mounted on the shaft 14', which is rotated by the motor through the gears 52 and 53. The movement of the cam follower 49 is proportional to the amount of stress being applied. If the stress is applied rapidly, the follower moves rapidly, and if the stress is applied slowly, the follower moves slowly. So, too, if the stress is applied at a constant rate, the follower moves at a constant rate.

My sensing device D' is connected to the follower or control member 49 by the rod 54 and when the follower is moving at a constant rate, the device develops a constant D.C. signal, which is used to drive an indicating meter in a manner explained hereinafter. In this instance the meter may be calibrated in pounds per minute. In running a test, the testing machine operator merely has to manipulate the handwheel 23 such that the needle remains in a fixed position with respect to a preselected calibration and the article is stressed at a desired constant rate.

In the foregoing I have described the application of the invention to the manual control of constant crosshead motion, constant straining or constant stressing. The invention is also applicable for automatic operation for the control of these testing procedures. This will be taken up after a description of the sensing devices D and D' and the manner in which they are used to drive the indicating meter.

Figures 4, 5, 6:
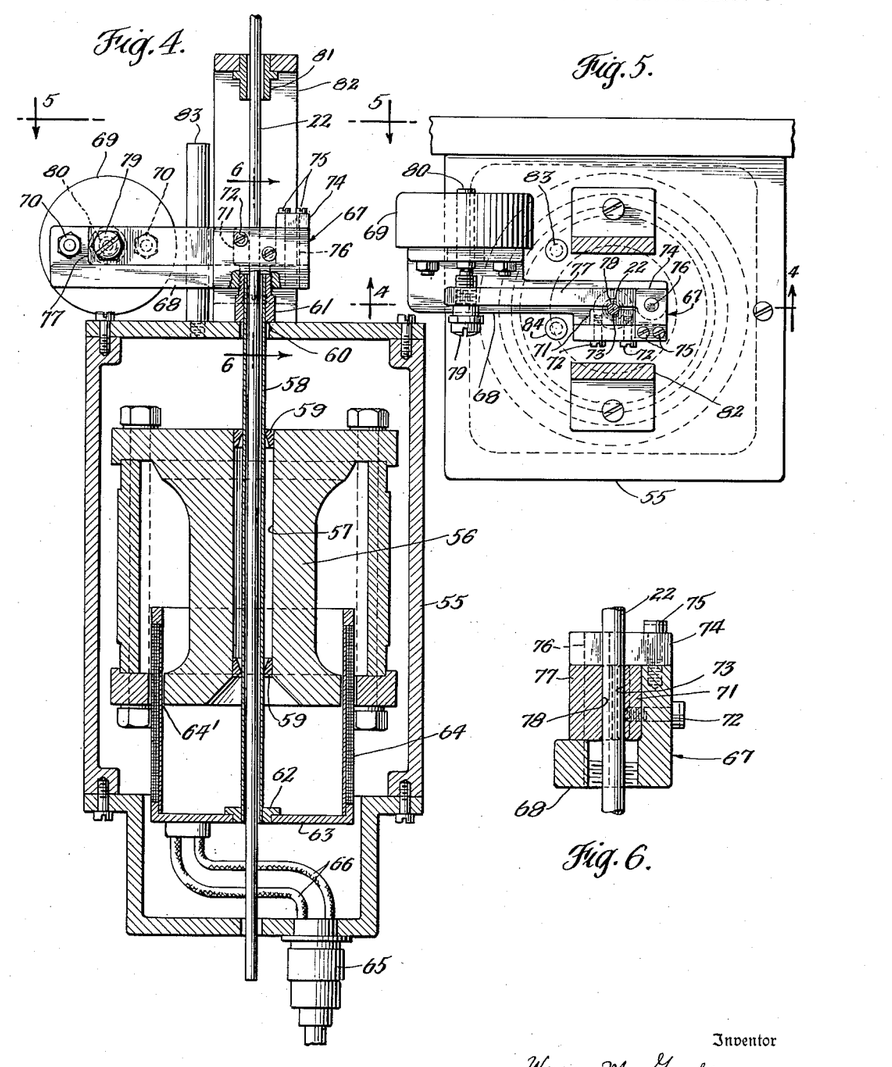
FIGURE 4 is a vertical section on the line 4—4 of FIGURE 5 showing a sensing device D of FIGURE 1.
FIGURE 5 is a plan section on the line 5—5 of FIGURE 4.
FIGURE 6 is an enlarged cross section on the line 6—6 of FIGURE 4 showing certain structure of the clutch mechanism.

The sensing device D is shown in FIGURES 4, 5 and 6. A housing which is generally indicated by the numeral 55 is adapted to be secured on a bracket such as bracket 21 shown in FIGURE 1, by any suitable means. The housing carries a permanent magnet 56 fixedly attached thereto. An aperture 57 in the magnet carries a tube 58, slidably mounted within the aperture by the bearings 59—59. The tube extends through an aperture 60 in the top of the housing and a bushing 61 is secured thereto. The lower end of the tube is secured to an insert 62 which carries the coil form 63 on which is wound the coil 64. The lead-out connections are generally designated by 65 and include flexible wires 66. The coil extends through the air gap 64' of the magnet. When the tube 58 is moved, the coil cuts the flux in the air gap. When the rate of movement of the coil is constant, a constant D.C. voltage is developed whose magnitude is proportional to the rate of movement.

The tube 58 is adapted to be moved by the rod 22 which is secured to the movable crosshead m as mentioned in connection with the description of FIGURE 1. The rod is interconnected with the tube 58 by means of the clutch mechanism, generally designated by 67. The clutch has a main body portion 68 which is threaded on the bushing 61 and on one end of the body portion is mounted a solenoid 69 by means of the bolts 70—70. The other end of the body portion carries an insert 71 secured thereto by bolts 72—72. The insert has a vertically extending groove 73 in which is disposed the rod 22. A bracket 74 is also secured to the body portion by means of the bolts 75—75 and carries a pivot 76 which mounts the clamping arm 77. The arm has a vertically extending groove 78 which mates with the rod 22. The outer end of the arm 77 has an adjustable nut 79 which engages the plunger or core 80 of the solenoid.

The solenoid is normally energized so that the plunger moves the arm 77 about the pivot 76 and the rod is held in the grooves 73 and 78. If the rod is moved upwardly, the clutch, hence the tube 58 and the coil 64, are carried along. The clutch may be moved upwardly until it engages the abutment 81 mounted in the U-shaped bracket 82 secured on the housing 55. Upon engagement, slippage occurs and the rod may continue to move while the clutch, hence the tube and coil, remain stationary. At this time the voltage or signal being generated by the coil drops off. The solenoid 69 is then momentarily de-energized by manual operation of a re-set button. The clutch drops down until the bushing 61 contacts the top of the housing 55. The solenoid is then re-energized and the coil is again carried upwardly. The guides 83 and 84 prevent the clutch from twisting beyond desired limits during the up and down movement.

The energizing and de-energizing of the solenoid is accomplished by means of a re-set button (described later), which preferably is mounted on the meter M. When the operator sees the needle on the meter begin to drop off, he pushes the re-set button, holds momentarily, and then releases the same. The time lag in the re-set operation is very small and for all practical purposes, the signal from the coil appears as continuous.

The principal reason for providing the clutch arrangement is to minimize the length of the coil required. For example, in testing some specimens, particularly in the plastic stage, there may be considerable deformation. In lieu of my clutch arrangement, a coil of considerable length would be necessitated in order to generate the required signal. By using the clutch and re-set system, the coil can be kept to a length which is consistent with the great majority of testing operations.

Figure 7:
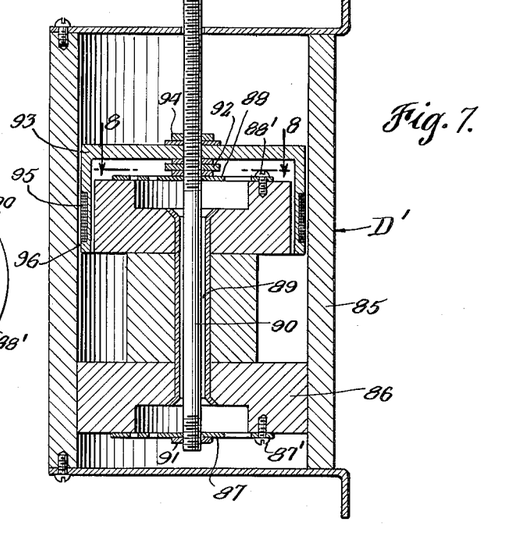
FIGURE 7 is a vertical section of the sensing device D' of FIGURES 2 and 3.
Figure 8:
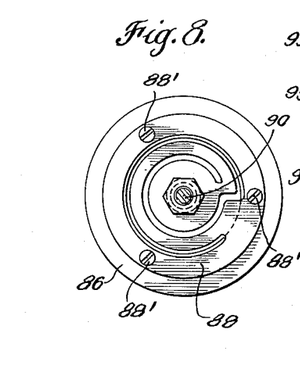
FIGURE 8 is a sectional view taken on the line 8—8 of FIGURE 7.

In FIGURE 7 I have shown a sectional view of the sensing device D' which is used in the application as described in connection with FIGURES 2 and 3. The unit comprises a generally cylindrical-shaped casing 85 made of magnetic material and within the casing is mounted a generally spool-shaped permanent magnet 86. On each end of the magnet are respectively mounted the springs 87 and 88, the preferred shape of which is shown in FIGURE 8. The springs are secured on the magnet by screws 87' and 88' and may have oversize holes to permit adjustment. The magnet has an aperture 89 within which is disposed a rod 90 which is provided with threads 90a for attachment to the rods 27 or 54 by coupling 90b. The rod 90 is connected to the springs by the mounting assemblies 91 and 92 and carries a coil form 93, which is secured thereto by the mounting assembly 94. The coil form carries the coil 95. As will be apparent, when the rod is moved up or down, the coil moves within the flux gap 96 to generate a voltage. The leads of the coil are connected to the outside of the housing by means (not shown).

The sensing device D' has several unique advantages. For example, the casing serves the dual function of a housing and a magnetic path. Also, the device is relatively insensitive to stray magnetic fields, since the casing acts as a magnetic shield. A very important advantage is the accuracy with which the coil can be aligned in the flux gap. Note that the springs themselves support the coil and that the springs are mounted on the magnet. By adjusting the springs on the magnet, the coil can be accurately fixed in the air gap.

Both of the devices D and D' have particular advantage in the type of testing work herein described. Often times the rate of movement of the crosshead or of either of the control members is in the order of $\frac{1}{100}$ of an inch per minute. Both of the sensing devices are very sensitive at such extremely low velocities and are able to develop a useable D.C. sensing signal.

Figure 9:
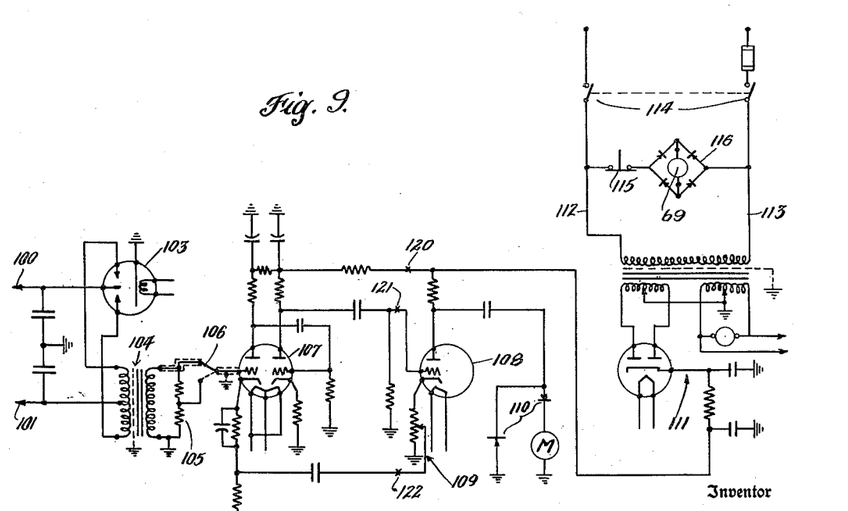
FIGURE 9 is a wiring diagram illustrating the manner in which the signal from the sensing device of FIGURE 1 is used to drive the meter M during manual operation.

In FIGURE 9 I have shown a typical circuit to receive a signal from the device D and drive the meter M. The D.C. signal from a sensing device D is received on the terminals 100 and 101, the terminal 100 preferably being positive. The D.C. signal is changed to A.C. by the chopper 103 and the step-up transformer 104. The secondary of the transformer is shunted by the voltage divider 105, which is connected with a range selector switch 106. In the position shown, the full secondary voltage is taken from the transformer and when in the position shown by the dotted lines, only a portion of the voltage is taken off.

This signal is fed to tube 107, which is connected as a two-stage amplifier, and thence to a tube 108, which is arranged for a third stage of amplification. A feedback loop is designated by 109. From the third stage the signal is rectified by the rectifier 110 and then applied to the indicating meter M.

Plate voltage is supplied by the power supply 111. The input lines 112 and 113 of the power supply have a gang switch 114 and across the lines is the re-set button 115, in series with a rectifier 116. The rectifier supplies D.C. voltage to the solenoid 69.

The circuit of FIGURE 9 can be used for stress or strain testing. In such instances the signal fed to the terminals 100 and 101 is from the sensing device D'. Also, the re-set button 115, the rectifier 116 and solenoid 69 are not used. Additionally the indicating meter is calibrated in terms of rate of strain (inches per inch per minute) or in rate of stress (pounds per minute).

As mentioned heretofore, the invention may be applied for the automatic control of a testing machine where the load-applying system is hydraulic, or where the load-applying system is electro-mechanical. Typical examples of such applications will be explained as follows.

In FIGURE 1 I have shown a testing machine having a hydraulic loading system. In adapting this machine whereby the rate of straining may be controlled automatically, the signal generated by my sensing device D' (FIGURE 2) is used to actuate a transfer valve which controls the flow of fluid to the cylinder of the machine, and hence, controls the cross-head motion and rate of deformation of the specimen.

Figures 10, 10A, 10B, 11:
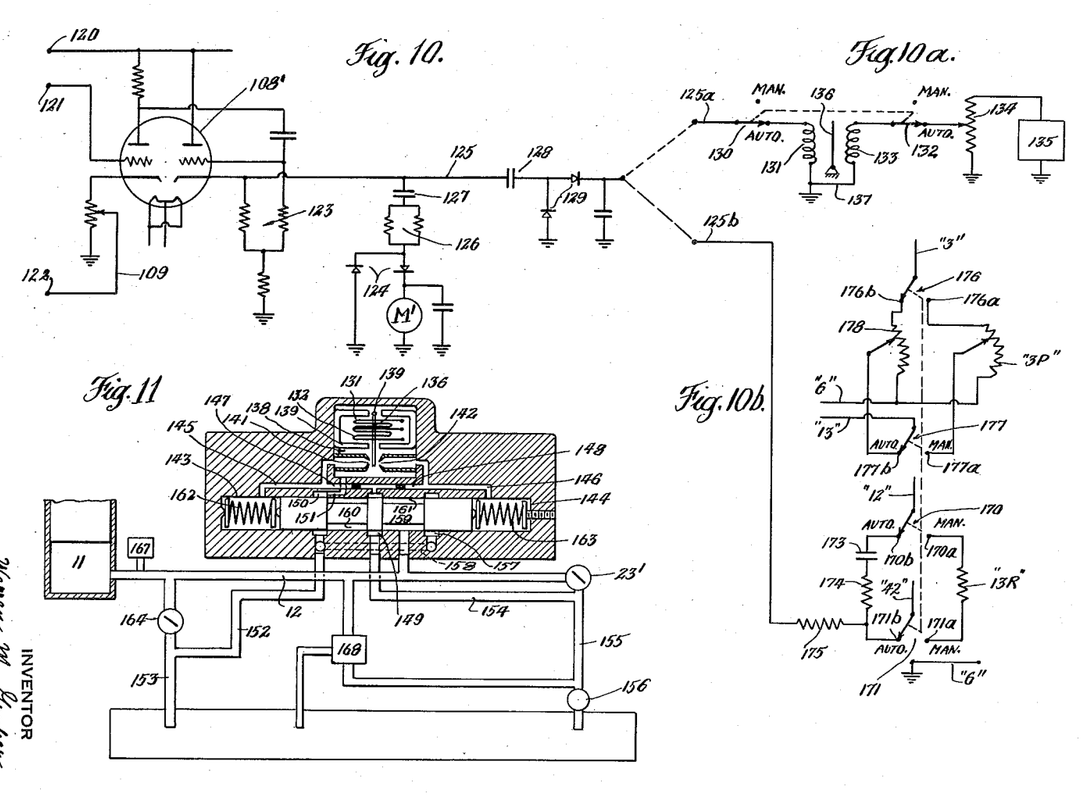
FIGURE 10 is a wiring diagram showing the manner in which the circuit of FIGURE 9 may be modified in applying the invention for automatic control of a testing machine.
FIGURES 10a and 10b are wiring diagrams respectively illustrating the manner in which the invention is used for automatic control of a hydraulic type testing machine and an electro-mechanical type testing machine.
FIGURE 11 is a diagrammatic view of a transfer valve and the hydraulic system of a testing machine.

For automatic operation, the circuit of FIGURE 9 may be modified as shown in FIGURE 10. The points 120, 121 and 122 of FIGURE 10 correspond to points 120, 121 and 122 shown in FIGURE 9. In this latter figure, the portion of the circuit to the left of these points may be the same for both manual and automatic operation, except that the re-set button 115, rectifier 116 and solenoid 69 may be removed for stressing or straining. To the right of these points the circuit is modified as shown in FIGURE 10. The first half of the tube 108' is connected as a third stage of an amplifier, while the second half is used as a cathode follower, the external connections for this being indicated by the numeral 123. The meter M' is connected to a rectifier 124, which is connected to a signal line 125 through the calibration or bias resistors 126 and the blocking capacitor 127. The output of the signal line 125 includes the blocking capacitor 128 and rectifier-filter generally indicated by 129.

For use with a hydraulic machine, the output of signal line 125 is connected to line 125a (FIGURE 10a) as indicated by the short dashed line. The line 125a is connected to a switch 130. When the switch is in the automatic position (as shown), the signal line is interconnected to a coil 131 of a transfer valve. The switch 132, when in automatic position (as shown), interconnects the other coil 133 of the transfer valve to a voltage divider 134, which is supplied with a known voltage from regulated voltage supply 135. As is indicated, the coils 131 and 133 have a common connection to ground, as indicated at 137, and the switches 130 and 132 are ganged. When current is flowing in the coils, a force is developed to move a flapper 136, which controls the flow of oil to the testing machine cylinder. The manner in which this is done will be explained in connection with FIGURE 11.

FIGURE 11 is a somewhat diagrammatic representation of a transfer valve and of the hydraulic circuit of the testing machine of FIGURE 1. The function of the transfer valve is to convert the electrical signal of the sensing device D' into a proportional hydraulic flow or velocity of the piston actuating the movable crosshead. The valve has a chamber 138 mounting the permanent magnet 139, which surrounds the coils 131 and 133. The flapper 136 is disposed within the coils, being pivoted at 139, and operates between the orifices 141 and 142 to open and close the same. These orifices are respectively connected with chambers 143 and 144 by passages 145, 146. The passages 147 and 148 respectively connect the passages 145 and 146 with an annular passage 149. The annular passage 150 is interconnected with the chamber 138 by the passage 151. The annular passage 150 is also connected with the line 152, which is in communication with the drain line 153. The annular passage 149 is connected with line 154, which is connected to pressure line 155, supplied with fluid by the pump 156. The annular chamber 157 is in communication with a line 158, which is connected with the drain line 152.

The spool 159 is arranged to form two chambers 160 and 161. The springs 162 and 163 bias the spool, such that when the unit pressures in chambers 143 and 144 are equal, the spool is centered in the position shown. When the switches 130 and 132 (FIGURE 10a) are in manual position, the flapper 136 is centered between the orifices 141 and 142 by means of a bias spring not shown.

With the foregoing positions of the flapper and spool, fluid may flow from pump 156 through line 155, line 154, annular chamber 149, out through passages 147, 148, thence through the passages 145 and 146 to orifices 141 and 142, through chamber 138, passage 151, annular chamber 150 and out to drain lines 152, 153. Since the flapper 136 is centered, the pressure drop at each orifice is equal and the unit pressures in chambers 143 and 144 are equal. It should be pointed out that the numerals 167 and 168 respectively represent safety and relief valves for the hydraulic circuit.

When the machine is in manual position as above described, the movable crosshead may be activated by closing the drain valve 164 and opening the loading valve 23' so that fluid under pressure is supplied to the cylinder 11' through the line 12. The operator manipulates the loading valve 23' and the sensing device D' (FIGURE 2) generates a signal which drives the meter M' (FIGURE 10). The needle of the meter M' is made to coincide with the selected calibration, and so long as the needle is maintained in said alignment, the specimen will be strained at a desired constant rate.

The machine is set up for automatic operation as follows: The valves 164 and 23' are closed and the switches 130 and 132 are set to automatic position. The operator manipulates the potentiometer 134 until the needle of the meter comes into coincidence with the calibration corresponding to the desired straining rate, and then the machine operates to strain the specimen at this desired rate. This takes place as follows.

When the switches 130 and 132 are closed, current flows through the coil 133 and the flux generated creates a force on the flapper 136 to move the same to decrease the opening of the orifice 142 and increase the opening of the orifice 141. Thus, the unit pressure in chamber 144 increases above that in chamber 143, and the spool tends to be moved to the left as indicated by the arrow. This causes fluid from the annular passage 149 to flow into the chamber 161 and then into line 12 to the cylinder 11', and the crosshead is moved to cause deformation of the test specimen.

The sensing device D' then generates a signal and current flows through the coil 131. The flux generated reacts with the flux from coil 133 and develops a resulting force which tends to move the flapper so as to open the orifice 142 and close the orifice 141. Thus, the flow of oil to cylinder 11' is decreased and the crosshead tends to slow down. Since the current in coil 131 is proportionate to the rate of deformation, it will be apparent that the potentiometer 134 can be adjusted whereby the currents in the two coils 131 and 133 produce a force on the flapper to control the flow of oil to the cylinder 11' so that the test specimen is deformed at some desired constant rate.

When the test run is completed, the switches 131 and 132 are turned to the manual position and the drain valve 164 is opened and the testing machine crosshead returns to its normal position.

While the above description of automation was made in connection with straining, it will be apparent that the components described can be utilized so as to adapt the machine for obtaining constant stressing rate or constant crosshead motion.

Figure 12:
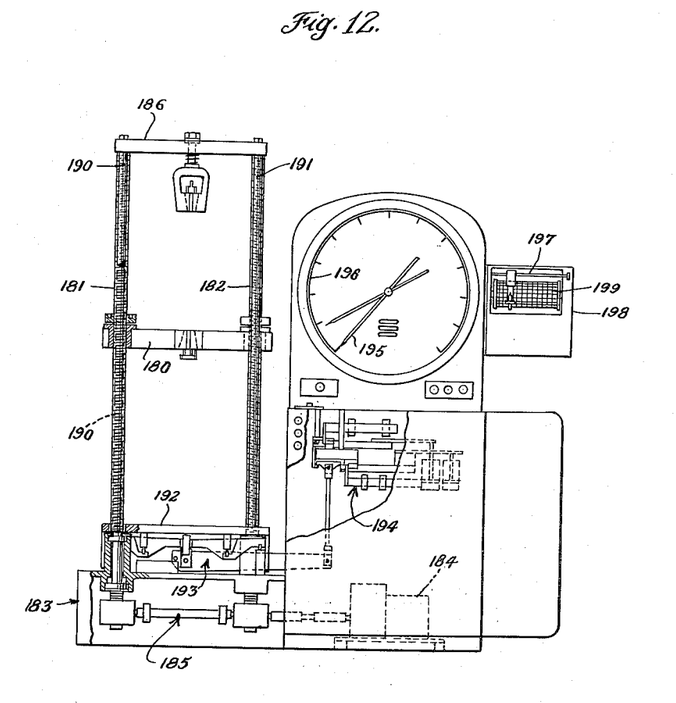
FIGURE 12 is a sectional elevational view of an electro-mechanical type testing machine to which the invention may be applied.

The manner in which the invention is applied to an electro-mechanical loading type machine to obtain constant straining rate will next be described in connection with FIGURES 10, 10b and 12.

All mechanical loading systems are generally similar in that the movable croshead has a pair or two pairs of screws which are adapted to be moved up and down by a gearing arrangement operated by an electric motor. A typical electro-mechanical system is shown in FIGURE 12.

The movable crosshead 180 is mounted on a pair of screws 181 and 182 rotatably supported in a frame 183 and driven by the motor 184 through a gearing arrangement 185. The fixed crosshead 186 is mounted on four columns, the front two of which are designated at 190 and 191. The columns are secured to the table 192. For tension testing a specimen is held between the fixed crosshead 186 and the movable crosshead 180 and for compression testing the specimen is held between the table 192 and the movable crosshead 180. The crosshead 180 is moved downwardly for either type of test. The reaction of the movement of the crosshead 180 is taken through the crosshead 186, the columns 190, etc., and table 192, the table effecting movement of a lever system 193 which activates the torque bar weighing unit 194. A typical torque bar weighing unit is shown in Patent No. 2,729,973 assigned to the same assignee as this invention. The torque bar weighing unit is part of or drives the registering system described in connection with FIGURE 3 with the torque bars being substituted for the Bourdon tubes. The indicating system drives the pointer 195 over the scale 196 to indicate stress or load applied to the specimen. The same system drives the pin 197 of the recorder 198. The drum 199 of the recorder is driven as explained in connection with the drum 7 of FIGURE 1.

For indicating crosshead motion my device D is connected between the table 192 and the movable crosshead 180 and is used in a manner as described heretofore. For indicating rate of stressing my device D' is connected as explained in connection with FIGURE 3. For indicating rate of straining my device D' is connected as explained in connection with FIGURE 2. In the matter following I will describe how my invention is used for manual and automatic control of straining. It will be understood that the same technique can be used to control rate of stressing.

The motor 184 mentioned above is a D.C. shunt type with a "Thymotrol" system for controlling motor speed. ("Thymotrol" is the General Electric trademark for motor controls using electron tubes.) These types of controls are described in General Electric's publications, such as GET-2294 and GEI-19766B, and the details of construction, function and operation need not be described here. In one application of my invention to an electro-mechanical loading system, I have used "Thymotrol" CR7507–F101 shown on page 5 of General Electric Bulletin GEI-19766B.

In this type of system a portion of the armature voltage is fed back and compared to a known reference voltage. The difference between the two voltages produces a signal which is used to control the speed of the motor. The reference voltage may be varied so that a wide range of speed control is possible. In applying my invention to this type of control, I interject or substitute the signal for my control device D or D' for the armature feed-back voltage, and this signal is compared with the reference voltage mentioned above. Hence, the difference or error voltage, which is a function of the voltage from my sensing device, is used to control the motor speed. The manner in which I have accomplished this will be explained in connection with FIGURES 10 and 10b.

The armature voltage feed-back circuit in the "Thymotrol" system mentioned above has a 510K resistor labeled "13R" with connecting leads labeled "12" and "42." I remove this resistor from the "Thymotrol" circuit and mount the same within the housing of the meter M'. The leads "12" and "42" are also brought out of the "Thymotrol" system and connected to gang switches 170 and 171 (FIGURE 10b) mounted on the housing of the meter. Across the contacts 170a and 171a I mount the resistor "13R," and across the contacts 170b and 171b I mount a capacitor 173 (about 2 mfd.), and a resistor 174 of about one-tenth of the value of resistor "13R." The output of signal line 125 (FIGURE 10) is connected to line 125b (as indicated by the long dashed lines) which is in turn connected to contact 171b through the damping resistor 175.

When the switches 170 and 171 are in the manual position, the armature voltage feed-back is from lead "12" through resistor "13R" and thence through lead "42." The signal from line 125b is, of course, isolated from the feed-back circuit. When the switches 170 and 171 are in automatic position, the capacitor 173 prevents any feed-back from line "12" to line "42" except at such time when the motor speed is not constant. I use the capacitor 173, resistor 174 combination to permit some feed-back when the motor speed is changing for stabilization purposes, i.e., to prevent the overshoot. The D.C. signal from line 125b goes through the resistor 175, switch 171 and line "42." This signal then is interjected into the feed-back circuit and is compared with the reference signal as mentioned below. The D.C. signal in the line 125b is proportioned to the signal from the device D' (see FIGURE 2) or to the rate of straining as explained heretofore.

The "Thymotrol" circuit has a potentiometer "3P" which controls the reference signal. The ends of this potentiometer are connected to leads labeled "3" and "6," and the movable arm of the potentiometer is connected to a lead labeled "13." While this potentiometer may be used for both automatic and manual operation, I prefer to shunt the potentiometer with another potentiometer and use one for control during the testing operation, and use the other to get rapid traverse of the cross-head after the testing operation. The latter may also be used to generate the reference signal during manual operation. The arrangement for accomplishing the foregoing is shown on the top part of FIGURE 10b.

I remove the potentiometer "3P" from the "Thymotrol" and mount the same on the housing of the meter M'. The leads "3," "6" and "13" are brought out to the meter. The lead "3" is connected to a switch 176 and one side of the potentiometer "3P" is connected to the terminal 176a. The other side of the potentiometer is connected to the lead "6," which is at ground potential. The movable arm of the potentiometer "3P" is connected to the terminal 177a of a switch 177. The movable arm of switch 177 is connected to the lead "13." It should be observed here that the switches 176 and 177, 170 and 171 are ganged for simultaneous operation.

The terminal 176b is connected to one side of a second potentiometer 178, the other side of the potentiometer being connected to the lead "6." The movable arm of the potentiometer 178 is connected to the terminal 177b of the switch 177.

In manual operation the swtiches 176, 177, 170 and 171 are turned to manual position. The armature voltage feed-back of the "Thymotrol" will be connected to feed back a voltage and the speed of the motor may be controlled by manipulation of the potentiometer "3P." The testing machine operator manipulates the potentiometer "3P" until the needle of the meter M' coincides with the preselected calibration and then remains fixed with respect thereto. The testing machine crosshead will be moved so that the test specimen is strained at the desired rate.

In automatic operation, the signal for my control device D' is fed to the "Thymotrol" feed-back circuit. The potentiometer 178 is manipulated to bring the needle of the meter M' into coincidence with the desired calibration, and then the machine automatically strains the test specimen at the rate selected.

After the test is completed, the "Thymotrol" is adjusted reverse the motor direction and the switches 176, 177, 170 and 171 are set to manual position. The potentiometer "3P" then can be manipulated so as to bring the crosshead back to normal position at a rapid rate.

I claim:

1. In a testing machine, apparatus for indicating rate of change of condition comprising; an indicating member adapted to be movable to any of a plurality of fixed positions, each position being in accordance with a desired rate of change of condition; means for driving said indicating member to any of said positions including a magnet element and a coil element both connected with the testing machine and mounted for relative linear movement with respect to one another whereby said coil develops a D.C. signal; and mechanism connected between said coil and said indicating member for effecting movement thereof in accordance with said signal.

2. For use in a testing device having means to move a member in accordance with a rate of change of condition of a body being tested, a rate of change of condition indicator comprising: a sensing device to develop a D.C. signal comprising a magnet element and a coil element mounted for relative linear movement with respect to one another, one of the elements being adapted for connection to the movable member of said testing device; and means connected to said sensing device to receive said signal and measure and indicate the same in terms of change of condition per unit of time including mechanism to amplifying said signal.

3. For use in a testing machine having means to move a control member in accordance with the rate of strain of an article being tested, a rate of strain indicator comprising: a sensing device including a magnet element and a coil element mounted for relative linear movement with respect to one another, said relative movement developing a D.C. signal in said coil, one of the elements being adapted for connection to the control member of said testing machine; a converter connected to said coil to receive said signal and to convert to an A.C. signal; an amplifier connected to said converter to receive and amplify said A.C. signal; and a meter connected to said amplifier to receive and measure said amplified signal.

4. A construction in accordance with claim 3 wherein said meter is of the D.C. type and further including rectifier means electrically interconnecting said amplifier and said meter.

5. A construction in accordance with claim 3 further including spring means interconnecting said magnet and said coil and providing for said relative movement.

6. For use in a testing machine having means to move a control member in accordance with the rate of stress applied to an article being tested, a rate of stress indicator comprising: a sensing device including a magnet element and a coil element mounted for relative linear movement with respect to one another, said relative movement developing a D.C. signal in said coil and one of said elements being adapted for connection to said control member; a converter connected to said coil to receive said signal and convert to an A.C. signal; an amplifier connected to said converter to receive and amplify said A.C. signal; and a meter connected to said amplifier to receive and measure said amplified A.C. signal.

7. A construction in accordance with claim 6 wherein said meter is of the D.C. type and further including rectifier means electrically interconnecting said amplifier and said meter.

8. A construction in accordance with claim 6 further including spring means interconnecting said magnet and said coil and providing for said relative movement.

9. For use in a testing machine having a fixed and a movable crosshead, a crosshead motion indicator comprising: a magnet adapted to be fixed in position with respect to said fixed crosshead; a coil movable with respect to said magnet whereby to develop a D.C. signal; a tubular member connected to said coil; a rod slidably disposed in said tubular member and adapted for connection to said movable crosshead; means selectively operative to prevent relative movement between said rod and said tubular member; and means to indicate said signal.

10. For use in a testing machine having a fixed and a movable crosshead and means for moving said movable crosshead in the testing of an article, a crosshead motion indicator comprising: an indicating member movable to any of a plurality of fixed positions, each position being in accordance with a desired rate of movement of the movable crosshead; and means for driving said indicator to any of said fixed positions including linearly relatively movable magnet and coil elements, one of said elements being adapted for connection to said movable crosshead.

11. In a testing machine of the type having a fixed and a movable crosshead between which an article may be supported for testing, mechanism to move said movable crosshead with respect to said fixed crosshead whereby to effect a change of condition of an article under test, means to move a control member in accordance with the rate of change of condition of said article, a permanent magnet and a coil linearly relatively movable with respect to one another, one element being connected with and movable by said control member whereby the coil develops a signal proportional to said rate of change of condition, and means responsive to said signal for effecting control of said mechanism.

12. In a testing machine of the type having a fixed and a movable crosshead between which an article may be supported for testing, hydraulic mechanism to move said movable crosshead with respect to said fixed crosshead whereby to effect a change of condition of an article under test, means to move a control member in accordance with the rate of change of condition of said article, a permanent magnet and a coil linearly relatively movable with respect to one another, one element being connected with and movable by said control member whereby the coil develops a signal proportional to said rate of change of condition, and means including a transfer valve responsive to said signal for effecting control of said hydraulic mechanism.

13. For a testing machine of the type having a fixed and a movable crosshead between which an article may be supported for testing and drive means for the movable crosshead including a D.C. motor and a speed control system for the motor of the type having an armature voltage feed-back circuit, mechanism for controlling the rate of change of condition of an article under test comprising: means to move a control member in accordance with the rate of change of condition of an article under test; a permanent magnet and a coil relatively movable with respect to one another, one element being connected with and movable by said control member whereby the coil develops a signal proportional to the rate of change of condition; and mechanism to inject said signal in said armature voltage feedback circuit whereby said signal effects control of said motor.

14. For use in a testing machine having a fixed and movable crosshead, a crosshead motion indicator comprising: a housing adapted for connection to said fixed crosshead; a magnet element fixedly mounted in said housing; a coil element mounted for movement through the field of the magnet to develop a D.C. signal; a first member slidably mounted on said housing and carrying said coil; a second member slidably mounted on said housing and adapted for connection to said movable crosshead to be moved thereby; a slip clutch mechanism carried by said first member; a solenoid carried by said first member for operating said clutch, energizing of the solenoid causing the clutch to hold the two members together so that movement of the second member causes movement of the first member; and an abutment on said housing disposed to be interengaged by said first member when the same is moved by said second member, said interengagement causing the first member to stop its movement and causing the clutch to slip and permit continued movement of the second member.

References Cited in the file of this patent

UNITED STATES PATENTS

| | | |
|---|---|---|
| 2,388,256 | Davis | Nov. 6, 1945 |
| 2,445,682 | Macgeorge | July 20, 1948 |
| 2,637,999 | Klebba | May 12, 1953 |

FOREIGN PATENTS

| | | |
|---|---|---|
| 571,003 | Great Britain | Aug. 1, 1945 |